United States Patent [19]

Morgan

[11] Patent Number: 4,883,421

[45] Date of Patent: Nov. 28, 1989

[54] DIRECTIONAL FLOW BAR EXTRUDER

[75] Inventor: Ronnie G. Morgan, Northbrook, Ill.

[73] Assignee: Nabisco Brands, Inc., East Hanover, N.J.

[21] Appl. No.: 181,709

[22] Filed: Apr. 14, 1988

Related U.S. Application Data

[62] Division of Ser. No. 24,079, Mar. 10, 1987, abandoned.

[51] Int. Cl.[4] .......................... B29C 47/00; A22C 7/00
[52] U.S. Cl. ...................................... 425/135; 264/108;
264/177.1; 425/376.1; 425/382.3; 425/382.4;
425/461
[58] Field of Search ...................... 264/108, 103, 176.1;
425/131.1, 382.4, 135, 382.3

[56] References Cited

U.S. PATENT DOCUMENTS

| | | | |
|---|---|---|---|
| 1,920,773 | 8/1933 | Walton | 264/171 |
| 3,108,883 | 10/1963 | Goeser | 99/164 |
| 3,350,485 | 10/1967 | Shesler et al. | 264/108 |
| 3,400,190 | 9/1968 | Donald | 425/133.5 |
| 3,432,311 | 3/1969 | Gruner | 426/264 |
| 3,464,087 | 9/1969 | Koch | 425/131 |
| 3,491,816 | 1/1970 | Harrison | 149/98 |
| 3,834,849 | 9/1974 | Supran et al. | 425/206 |
| 3,903,315 | 9/1975 | Giles et al. | 426/388 |
| 3,918,867 | 11/1975 | Beyer | 425/174 |
| 3,934,050 | 1/1976 | Hawkins | 426/645 |
| 3,947,535 | 3/1976 | Bagg et al. | 264/87 |
| 4,139,648 | 2/1979 | Small et al. | 426/511 |
| 4,195,489 | 4/1980 | Bernard | 62/63 |
| 4,239,785 | 12/1980 | Roth | 426/266 |
| 4,336,010 | 6/1982 | Thompson | 425/141 |
| 4,379,139 | 4/1983 | Dawson | 424/84 |
| 4,454,163 | 6/1984 | Gellman et al. | 426/549 |
| 4,454,164 | 6/1984 | Gellman et al. | 426/549 |
| 4,534,989 | 8/1985 | Gellman et al. | 426/549 |
| 4,534,990 | 8/1985 | Gellman et al. | 426/549 |
| 4,546,001 | 10/1985 | Gellman et al. | 426/549 |
| 4,551,343 | 11/1985 | Gellman et al. | 426/549 |
| 4,614,489 | 9/1986 | Juravic | 426/346 R |
| 4,626,436 | 12/1986 | Bradley et al. | 426/289 |
| 4,645,404 | 2/1987 | Juravic | 414/417 |
| 4,690,628 | 9/1987 | Dehennau et al. | 425/133.5 |

FOREIGN PATENT DOCUMENTS

887180 1/1980 U.S.S.R. .......................... 264/108

OTHER PUBLICATIONS

*The Wise Encyclopedia of Cookery*, Wm. H. Wise & Co., Inc., New York, (1949) pp. 648–649, 246-7 and 284–5.

Primary Examiner—Jay H. Woo
Assistant Examiner—Khanh P. Nguyen
Attorney, Agent, or Firm—Richard Kornutik

[57] ABSTRACT

An extrusion apparatus includes a housing having parallel top and bottom surfaces and a converging portion and a cooperating diamond-shaped flow bar for aligning fibers during extrusion of a meat dough. The flow bar is disposed in the housing such that trailing faces of the flow bar are parallel to the converging faces of the apparatus and the leading faces of the flow bar converge with the parallel faces of the housing and are spaced therefrom a distance to effect fiber alignment. The flow bar is rotatably mounted within the housing to control and vary the extent of fiber alignment as desired. A discharge nozzle is provided having a constricted portion tapering longitudinally and transversely toward the center of the nozzle to ensure fiber alignment throughout the width of the extruded dough. The extruder is able to effect substantial fiber alignment across a wide extrudate such that when cut into individual pieces, each piece will have a substantial portion of fibers uniformly aligned.

30 Claims, 7 Drawing Sheets

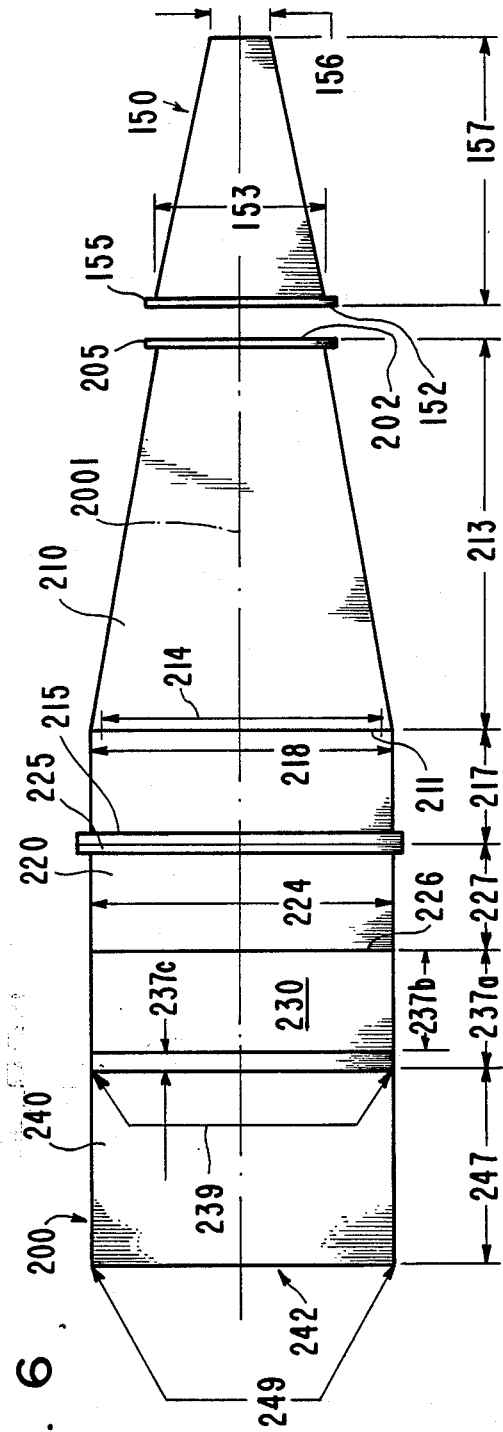
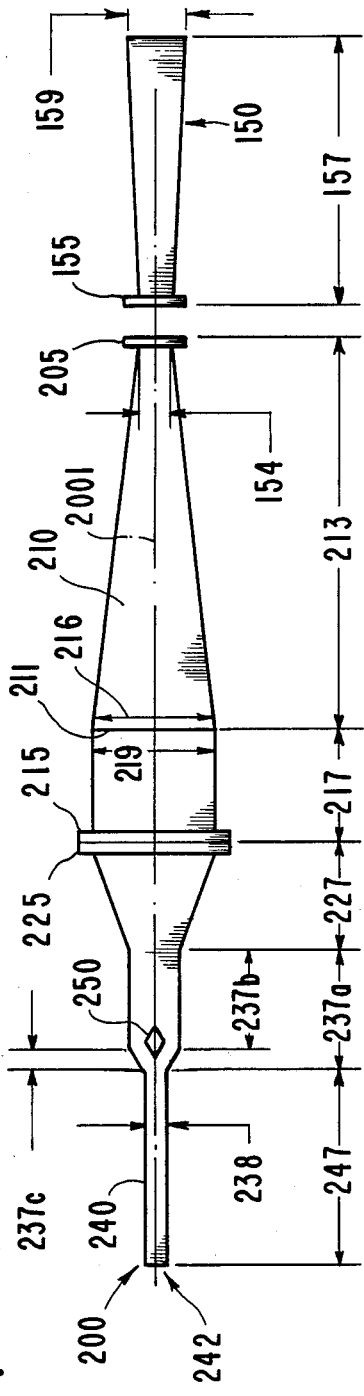
FIG. 6
FIG. 7

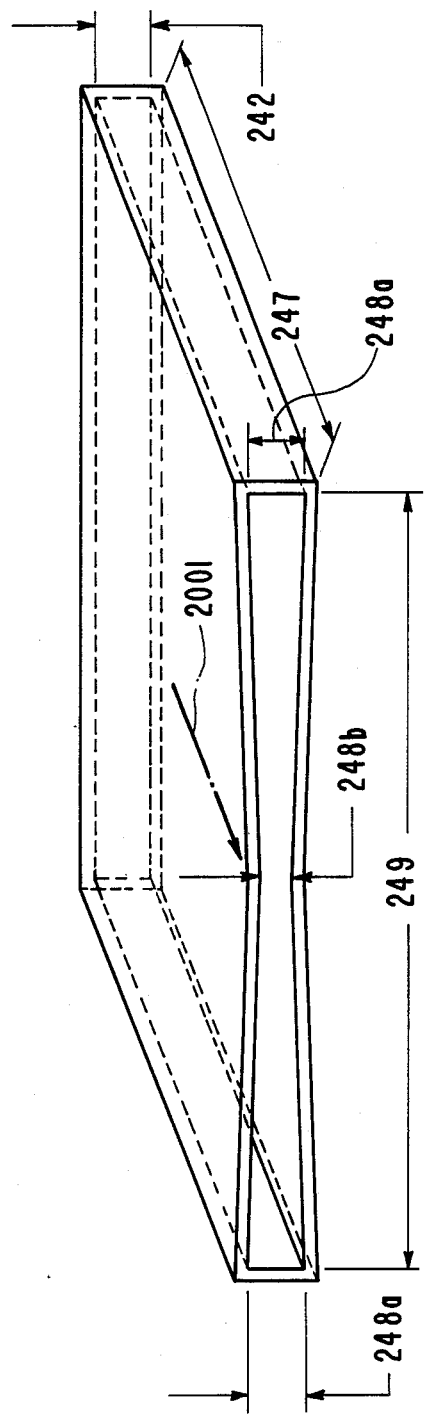

DIRECTIONAL FLOW BAR EXTRUDER

CROSS-REFERENCE

This is a division of U.S. patent application Ser. No. 07/024,079 filed Mar. 10, 1987 and now abandoned.

FIELD

This invention especially concerns an article, or apparatus, useful for carrying out the preparation of fiber containing goods generally having at least one component such as processed animal tissue and substitutes therefor. Said goods are generally useful as foods, especially including food for animals.

BACKGROUND

Naturally prepared jerky, also known as charqui, which typically is made with cut strips of striate muscle meat, is a distinctive, rugged food product. However, a significant amount of time and care is generally required in order to carry out its preparation, which generally includes sun drying. See, for example, *The Wise Encyclopedia of Cookery*, Wm. H. Wise & Co., Inc., New York (1949) at pages 648, 246 and 284.

In view of this, methods have been developed for preparing a jerky product which generally reduce the time and so forth required for such preparing in order to more favorably suit industrial needs. In common industrial practice, one of three methods have been or are typically employed, especially for preparing certain beef jerky products generally which have been or which are intended for canine consumption: loaf extrusion method, single strip extrusion method and ribbon strip extrusion method.

In the loaf extrusion method, in general, an appropriate jerky mixture is extruded under pressure through a generally small-sized loaf horn, which has an exit orifice of approximately 4 ½ inches (about 11.43 cm) in width by approximately 1 ¼ inches (about 3.18 cm) in height. A loaf is typically therethrough extruded to a length of approximately 2 to 4 or more feet (about 0.61 meters to about 1.22 meters or more). Typically, fibrous portions of the jerky dough are generally aligned thereby in a direction roughly parallel to the length of the loaf, and cutting of the loaf, say, at approximately ⅛ inch (about 0.32 cm) intervals, is carried out through planes perpendicular to the length and thus parallel to the width and height of the loaf. Characteristics of the resulting product include that any desirable fibrous portions are generally aligned roughly parallel to the jerky thickness dimension and perpendicular to the width and length dimensions, and the jerky may be somewhat undesirably crumbled by hand, that is, it has a "short texture."

In the single strip extrusion method, in general, an appropriate jerky mixture is extruded under pressure through an exit orifice of approximately the width and height of a single strip of the resulting jerky product, for instance, from approximately 1 to 1 ½ inches (about 2.54 cm to about 3.81 cm) in width by, say, approximately ⅛ inch (about 0.32 cm) in height. The single strip is generally appropriately cut roughly parallel with its width and height, and the cutting defines the length of the resulting jerky product which may be, say, from approximately 4 ½ to 5 inches (about 11.43 cm to about 12.7 cm). Characteristics of the resulting product include that its surface has a shiny appearance and slippery feel, which may be undesirable, and the edges of the resulting product have regularly defined, uniform lengthwise sides unnaturally straight board-like and sawed off ends. The resulting product is thus machine-made and uniform in appearance and seems artificial, or "plastic."

In the ribbon strip extrusion method, in general, an appropriate jerky mixture is extruded underpressure through an exit orifice of approximately the length and height of the resulting jerky product, for instance, from approximately 4 to 4 ½ inches (about 10.16 cm to about 11.43 cm) in length by, say, approximately ⅛ inch (about 0.32 cm) in height. The ribbon strip is generally appropriately cut roughly parallel with its length and height, and the cutting defines the width of the resulting jerky product which may be, say, from approximately ¾ to 1 inch (about 1.905 cm to about 2.54 cm). Characteristics of the resulting product include the shiny surface and so forth as with the product from the single strip extrusion method; any desirable fibrous portions are generally aligned roughly perpendicular to the length, and the jerky has poor lengthwise flexibility, "short texture" and unnaturally straight, boardlike and sawed-off lengthwise sides. The resulting product also is thus machine-made and uniform in appearance and seems artificial, or "plastic."

Other methods for making jerky in general are known. See e.g., Roth, U.S. Pat. No. 4,239,785 (Dec. 16, 1980), which particularly illustrates a certain single strip or ribbon strip type method.

In view of considerations including the foregoing, it is yet desirable to provide a jerky product generally natural in appearance, feel and so forth, including a jerky having such desirable characteristics as a rugged, generally natural-like, nonglossy appearance in conjunction with a natural texture and feel with physical properties of a generally natural tearability and so forth by providing appropriate fiber alignment therein. It is further desirable thereover to provide such a natural-like jerky product by means of a procedure favorably suitable to industrial needs.

SUMMARY

This invention especially includes a directional flow bar extruder and an apparatus having the directional flow bar extruder. This invention is useful for preparing a coextensively aligning jerky appropriately including lengthwise coextensively aligning jerky by passing an alignable meat dough through at least one directional flow bar extruder under conditions whereby fibers in said dough are substantially coextensively aligned, preparing a cuttable loaf, and cutting the latter under conditions whereby the coextensively aligning jerky is prepared. The lengthwise coextensively aligning jerky can be a generally edible food, ingestible medicament, bait and so forth and the like especially for animals, including edible food and so forth for such pets as cats and desirably dogs and can have a highly desirable texture, being generally sensed as a very rugged, natural-like product with a plurality of surfaces typically capable of having a matte appearance and especially in the case of the lengthwise coextensively aligning jerky can have a natural-like lengthwise tearability with good lengthwise flexibility.

A significant hallmark of the parent invention is the discovery that turning a cut loaf portion perpendicular with its initial cut transverse to fiber alignment along its direction of flow of extrusion and further cutting parallel with the fiber alignment can provide the uniquely natural-like lengthwise coextensively aligning jerky. A significant hallmark of this invention is the directional flow bar extruder and the apparatus having the directional flow bar extruder, which can provide the ability to produce the coextensively aligning jerky by a loaf-type method employing the directional flow bar extruder, say, of about 20 inches (about 50.8 cm) or more in width, at commercially favorable rates.

Illustrative Detail

In general, the coextensively aligning jerky is a product containing animal tissue and/or the like and having a fibrous portion which is coextensively aligned, preferably in a lengthwise manner, in reference to the final jerky product. The coextensive fiber alignment results in a generally parallel array of fibers in the jerky.

The alignable meat dough generally contains the fiber and animal tissue. By "fiber" is generally meant those portions of the alignable meat dough which include fiber-like or fibrous components thereof. The "animal tissue" generally includes suitable natural animal tissue and/or such suitable substitutes therefor as, for example, a textured soy protein resembling natural animal meat.

The fiber can come from the animal tissue or other sources such as, for instance, fiberous plants, for example, wheat straw, alginates or a suitable industrially generated fiber. Preferably, the fiber originates from such animal tissue as, for instance, striated muscle tissue. The fiber can thus be considered such as that of or derived from salt soluble protein as found in the striated muscle tissue, or the like.

The animal tissue thus includes any suitable fleshy tissue from an animal, for instance, from worms, shellfish, fish, amphibians, reptiles and more desirably, birds and/or mammalian animals, including, of course, such mammals as rabbits, whales and the like, especially from domestic poultry such as chicken, duck, geese and turkey and/or from larger mammalian animals which can range from aardvark to zebu. Fleshy tissue includes animal tissue such as meat and meat by-products. Fleshy tissue from herbivorous mammalian animals such as antelope, bison, cows, deer, elk and so forth is highly suitable, with such fleshy tissue as of beef, which includes beef meat and beef meat by-products, more commonly employable. Also highly suitable is such fleshy tissue including animal tissue as poultry meat and poultry meat by-products, with such fleshy tissue as of chicken and/or turkey meat and their meat by-products, more commonly employable. Said beef, that is, beef meat with beef meat by-products, is most typically employed.

Meat is that part of generally clean flesh derived from slaughtered animals and is generally striated muscle which is skeletal or that which is found, for example, in animals such as mammals, in the tongue, diaphragm, heart or esophagus, with or without accompanying and overlying fat and portions of the skin, sinew, nerve and blood vessels which normally accompany the meat flesh. Nonetheless, meat is not limited to that which is obtainable specifically from mammals. Meat by-products is the generally non-rendered, clean parts, other than meat, derived from slaughtered mammals and includes such organs and tissue as lungs, spleen, kidneys, brain, liver, blood, bone, partially defatted low-temperature fatty tissue, stomachs, intestines freed of their contents and so forth. Poultry meat by-products is generally non-rendered clean parts of carcasses of slaughtered poultry such as heads, feet, viscera, free from fecal content and foreign matter as with good industrial practice. Of course, other meat by-products, for example, fish meat by-products, are analogously derived and can be generally employed herein.

In general, it is desirable to have at least about 3 percent by weight fiber such as of the salt soluble protein as from the meat or meat by-products present in the alignable meat dough, and more suitably, at least about 5 percent by weight of such fiber present therein. The upper limit of same is generally only limited by the amount of such fiber available and by cost. For example, about 100 percent beef meat will provide excellent fiber alignment but can be cost prohibitive for animal consumption. About 100 percent beef lungs can provide a suitable alignable meat dough for animal consumption. Also, for example, an alignable meat dough containing meat and/or meat by-products can prototypically provide a component such as that of total striated muscle of at least about 20 percent by weight, based upon the total weight of meat and meat by-products. If lower amounts are used, the final product may tend to lose lengthwise flexibility and tear resistance. The total striated muscle which is contained in the alignable meat dough can be about 50 percent by weight based upon the total weight of components such as the meat and meat by-products. The total weight of meat and meat by-products can also suitably range from about 60 percent to about 80 percent by weight of the total alignable meat dough which is to be extruded. The addition of salt, say, to about four percent by weight of the alignable meat dough, and employment of heat, say, to about 40° F. (about 4.4° C.), typically increases the strength and so forth of such fiber components, thus lowering necessary levels of such fiber as from tee salt soluble protein.

Components such as plant matter including farinaceous material(s), for example, soy flour, wheat germ or corn meal and so forth can be employed. Suitable of such components include glutens such as, for example, of wheat, oats, barley, corn and so forth and the like, those such as textured soy protein, soy isolates, soy concentrates, albumin as from eggs or the like, gums and the like, alginates which reaction with calcium ions and/or acids is well known for forming such as gelled blocks, and are contemplated sources of the fiber. The starches, too, can often include a source of the fiber and are employable as the plant matter components with or without such fiber.

Additional components such as edible salts, for example, sodium chloride and potassium chloride; other components primarily preservatives, for example, sorbic acid, and sodium and/or especially potassium salt(s) thereof; inert filler, generally a non-food and taste value component, for example, sodium silicate; water; sweeteners, for example, cane molasses, dextrose, maltose, fructose, glucose, galactose, saccharine, and so forth; a fat/wax/oil including such wax(es), for example, as paraffin and/or beeswax; such oil(s) for instance as vegetable oil(s) and/or animal oil(s) including vegetable, for example, corn oil, olive oil, palm oil, and/or cod liver oil; such added fat(s), for instance, as animal fat(s), for example, poultry fat, beef fat and/or whale blubber(s); spices, for example, garlic, cloves, onion, chili pepper, black pepper, sweet basil, bay leaf, marjoram, parsley, sage, rosemary and thyme; flavored foodstuffs, for example, cheese, cheese bits, cheese powder, eggs, egg bits, egg powder, bacon, bacon bits, bacon powder, and so forth and the like; other desirable flavorings such as bacon flavoring, fish flavoring, poultry flavoring, liquid smoke flavoring and/or airborne smoke, and so forth; flavor enhancers such as, for example, monosodium glutamate; and so forth and the like can be additionally employed. An acidic substance is preferably added in conjunction with any addition of the sorbate salts and the like in order to raise the acidity which enhances the actions of the sorbate salts and the like. The preferred acidic substance for this purpose is generally lactic acid because the final product also seems to have a better flavor with beef from employment of same.

Further, components such as medically effective amounts of medicines, for instance, such a de-wormer as, for example, piperazine adipate, such an antibiotic as, for example, penicillin, vitamin supplements, mineral supplements, animal birth-control formulations, and so forth and the like; effective amounts of poisons which can be suitable for the kill and control of vermin, for instance, cyotes, such as, for example, sodium fluoride, warfarin, strychnine and so forth and the like; lacerating agents and/or poisons in conjunction with lacerating agents such as generally disclosed by Dawson, U.S. Pat. No. 4,379,139 (April 5, 1983), incorporated herein by reference, and so forth and the like also can be optionally employed as appropriate.

Amounts of such components in the meat dough can, in general, vary quite widely. Typical amounts of the foregoing which are suitably employed in the meat dough, which include those amounts desirably employed for preparing the coextensively aligning jerky, especially including the lengthwise coextensively aligning jerky, for canine animal consumption, are generally illustrated by the following tables. Note that the ranges which are listed therein may be interdependent to the extent that operation within a chosen percentage of one component may require operation within only a portion of a set percentage of another component, as is appropriate, and as is desired.

TABLE I

| Component | Approximate Weight Percent Range |
|---|---|
| Animal meat | 0 to 100, often 10 or 20 to 30 |
| Animal meat by-products | 5 to 100, often 50 to 60 |
| Soy flour | 1 to 20, often 5 to 10 |
| Edible salt(s) | as desired, often 2 |
| Preservative(s) | 0.1 to 2, often 0.5 to 1 |
| Spice(s) | 0 to 7, often 1 to 5 |
| Total water content | 65 to 70 |
| Total fat content | 10 to 30, often 18 to 22 |

The following formulations are suitably employed.

TABLE II

| Component | Approximate Weight in Percent (%) |
|---|---|
| Beef lung | 53 |
| Beef meat (striated muscle) | 28 |
| Other ingredients able to include soy flour, solids, seasonings | 19 |
| Basic beef formulation total | 100% |

TABLE III

| Component | Approximate Weight in Percent (%) |
|---|---|
| Beef lung | 49 |
| Beef liver | 4 |
| Beef meat (striated muscle) | 28 |
| Other ingredients able to include soy flour, solids, seasonings | 19 |
| Basic beef liver formulation total | 100% |

In addition, further special flavorings can be added. For example, from zero to about 3 1/3 percent special beef jerky flavor can be added.

Such components, for example, as beef lungs and meat may be low in desired fat content. If such components as the beef lungs and meat are too low in the fat content which is desired, such a component, for example, as head meat, which is to be deducted from the weight of the component such as the lungs, is typically added to the beef containing alignable meat dough. In formulations such as in Tables II and III, up to about ten percent by weight head meat can be suitably added, and its weight is deducted from the weight of the lungs. With other specific animal tissues, the practice can be appropriately similar.

The alignable meat dough is most generally prepared by combining, as necessary and appropriate, components thereof. Usually, at least the animal tissue portion is generally uncooked. Also, temperature during the combining can range suitably as desired, commonly, for example, from approximately 20° F. to approximately 100° F. (about −6.7° C. to about 38° C.) and preferably, for example, from approximately 25° F. to approximately 40° F. (about −3.9° C. to about 4.4° C.) and typically to approximately 31° F. (about 0.5° C.) in initial mixing stages especially because the animal tissue is often obtainable in and is employed from a bulk state which is frozen. The combining is advantageously carried out by thorough physical mixing such as by industrial scale choppers, blenders or mixers as is known in the art. An industrial ribbon-type mixer is advantageously employed.

In general, the alignable meat dough can be passed through various conveyers, conduits, channels, horns, extruders and so forth, as is desired. Conditions of the passage are those sufficient to coextensively align at least a substantial portion of the fibers of the alignable meat dough. Desirably, this coextensive alignment involves substantially all of the alignable fiber.

The lengthwise coextensively aligning jerky can be made by employing an appropriately-sized, e.g., small-sized, loaf horn in lieu of the directional flow bar extruder(s). To make same, the resulting cuttable loaf is generally appropriately cut parallel to the direction of flow of the loaf, and the loaf is typically also appropriately cut at smaller intervals along and generally perpendicular to the length.

Simply first cutting the cuttable meat dough in a direction generally perpendicular to the length at, for example, intervals of approximately 4 to 5 inches (about 10.16 cm to about 12.7 cm), turning the cut loaf portions at right angles and preferably stacking the cut loaf portions so that fiber alignment in separate cut loaf portions is parallel throughout the stack and generally perpendicular to the row length provided by stacking in this manner (right rotated stack length) and next cutting generally perpendicular to the right rotated stack length, for instance, to a thickness of from approximately 1/16 to ¼ inch (about 0.16 cm to about 0.635 cm) generally enables preparation of the lengthwise coextensively aligning jerky. The first cutting is preferably carried out by employment of a suitable band saw and/or the like. The next cutting is preferably carried out by employment of a suitable cold cut slicer and/or the like, which can be termed "slicing." The exit orifice of the appropriately-sized loaf horn can be small-sized, that is, for example, suitably from about 3 or 4 (about 7.62 cm or about 10.16 cm) in width about 6 to 8 inches (about 15.24 cm or about 20.32 cm) in width and typically from about ¾ to 1 ½ inches to about 1.905 cm to about 3.81 cm) in height. Employment of a larger loaf horn, say, up to and including about the medium-sized category, that is, for example, greater than about 8 inches (about 20.32 cm) with the height from about ¾ to 1 ½ inches (about 1.905 cm to about 3.81 cm) up to approximately 12 or 13 inches (about 30.48 cm or about 33.02 cm) in the width with the height in the latter especially approximately 1¼ inches (about 3.18 cm) can be employed if one is willing to tolerate a larger proportion of the loaf which is extruded having less satisfactory coextensive fiber alignment, typically near the center portions of the loaf which is extruded. Thus, ratios of the width to height of the appropriately-sized loaf horn may range from, say, about 4:1 to about 9.2:1 generally within other criteria as set forth herein. Sizes or ratios of loaf horns and directional flow bar extruders herein are generally set forth as or based upon exit orifice dimensions as is commonly suitable in the art. The appropriately-sized loaf horn, as well as any other so-called loaf horn, does not include the directional flow bar.

However, the apparatus having the directional flow bar is preferably employed. A plurality of directional flow bar extruders may be employed such as in series, parallel or combination(s) thereof, for instance, in an oblique configuration. However, employment of an apparatus having a single directional flow bar extruder having a single directional flow bar is most typically employed.

The directional flow bar extruder generally confines the alignable meat dough within boundaries about the positioning of the directional flow bar(s). Suitably thus, in at least one direction along one axis which is non-parallel to the passage of the alignable meat dough, the alignable meat dough transfers a shearing stress between the volume about at least one directional flow bar and the boundary. Preferably, the directional flow bar extruder boundary about the directional flow bar(s) is a conduit which constricts the cross-sectional area of the passing alignable meat dough thereabout, thus creating suitable levels of shear stress within the alignable meat dough.

Fundamentally, in either the appropriately-sized loaf horn or especially in the directional flow bar extruder, the local Newtonian shear rate must generally as an illustration be at least about one score reciprocal seconds (20 s$^{-1}$) Preferably, especially with the directional flow bar extruder, this Newtonian shear rate is at least about 25 s$^{-1}$ Newtonian shear rate maxima of about 100 s$^{-1}$, to about 50 s$^{-1}$ or about 30 s$^{-1}$ are appropriately employable. Thus it can be seen that the flow properties, fluid and/or elastic, of the alignable meat dough affect the magnitude of the minimum suitable Newtonian shear rate which is employed.

Fundamentally also, the required Newtonian shear rate values must be characteristic of processing conditions of the alignable meat dough present substantially near the last exit orifice of the appropriately-sized loaf horn or especially the directional flow bar extruder.

Further, design of the appropriately-sized loaf horn and the directional flow bar extruder in general can be suitably made by employment of the following general relationship (R):

(R) N. Sh. ≃ 6Q/(WH$^2$)

wherein the "N. Sh." represents the Newtonian shear rate at the die wall, of which the units are commonly expressed in reciprocal seconds (s$^{-1}$);

the dividend "6Q" is the multiple of six times "Q," and the "Q" represents the volume flow rate of the passing alignable meat dough, commonly expressed in units appropriate to the units of the "N. Sh.," and the divisor "(WH$_2$)" is the multiple of the value of the "W" times the value of the square of the "H," wherein the "W" and the "H" represent the value of the width and the height, respectively, of the exit orifice of the appropriately-sized loaf horn or the directional flow bar extruder in general. In general, it is usually the case that the value of the "W" is about ten or more times the value of the "H" in employment of the general relationship (R) so that, for instance, the design of the appropriately-sized loaf horn can be generally suitable for the preparation of the lengthwise coextensively aligning jerky.

For example, a loaf horn of 16 inches (about 46.64 cm) in width by 1 ¼ inches (about 3.18 cm) in height in general when employed by itself cannot typically with common industrial machinery prepare the coextensively aligning jerky, as too much "waste" near the center of the loaf which is extruded is generally encountered, that is, the center is generally not well coextensively aligning. However, as stated, a 4 inch (about 10.16 cm) by 1 ¼-inch (about 3.18 cm) loaf horn and even a 12 inch (about 30.48 cm) by 1 ¼-inch (about 3.18 cm) loaf horn can be generally employed in the preparation of the lengthwise coextensively aligning jerky, each capable of providing Newtonian shear rates of up to about 41 cm$^{-1}$ and 21 cm$^{-1}$, respectively. However, the latter horn has some, for example, up to about one-third or more of the "waste."

Significantly along these lines, a loaf horn such as a 20 inch (about 50.8 cm) by 1 ¼ inch (about 3.18 cm) loaf horn or the 16 inch (about 46.64 cm) by 1 ¼ inch (about 3.18 cm) loaf horn that is modified such as by provision of a series of free-standing thin plates, which are vertically standing from and between the top and bottom (widthwise) portions of the horn and which are aligned parallel to the general axis of direction of flow of extrusion, typically cannot be employed for preparing the coextensively aligning jerky. Coextensive fiber alignment parallel to the axis of direction of flow of extrusion is typically insufficient for the substantial coextensive fiber alignment in the lengthwise and otherwise coextensively aligning jerky. The loaf horn, as known in the art, appears otherwise to have a housing somewhat similar to the directional flow bar extruder save for the exit orifice. The exit orifice of the known loaf horns typically has a less pronounced "channel inlet" and "channel exit" as prototypically described herein for the directional flow bar extruder.

Structurally in general, the directional flow bar extruder has a housing portion having a passageway with at least one entrance orifice and at least one exit orifice through which the alignable meat dough is passed by extrusion. Multifarious passageways are possible but are not generally preferred. Preferred is one entrance orifice and one exit orifice. Near the exit orifice(s) is (are) the directional flow bar(s), (each of) which generally extend(s) transversely across the width of the passageway(s).

Preferably, the width of the directional flow bar, and the directional flow bar extruder is from approximately ten inches (about 25.4 cm) to about fifty-inches (about 127 cm) in width with a height at the exit orifice of approximately one-half inch (about 1.27 cm) to approximately one and one-half inches (about 3.81 cm). Such a width from approximately fifteen inches (about 38.1 cm) to approximately twenty-five or thirty inches (about 63.5 cm or about 76.2 cm) with generally same height is typically employable.

The cuttable loaf which is obtained following extrusion through the directional flow bar extruder can generally be cut in any fashion to prepare various types of coextensively aligning jerky, including types having a short breakaway, having obliquely coextensively aligning fibers, that is, having coextensively aligning fibers which align regularly on an angle to a length, width, and/or thickness, or may be cut in such shapes, for example, as cubes, and so forth. However, the cuttable loaf which is obtained by extrusion through the apparatus having the directional flow bar extruder is preferably cut in a manner similar to the foregoing in order to provide for the lengthwise coextensively aligning jerky.

Provision of the cuttable loaf is typically made by appropriately solidifying the meat dough which has fibers therein coextensively aligning. By way of illustration, the solidifying can be by freezing. However, other appropriate solidifying means such as drying, cooking or combinations thereof with freezing may be used for solidifying the aligning meat dough for cutting. However, employment of an appropriately sharp or the like cutting instrument such as a razor or laser, a water knife, and so forth and the like can be employed to cut the loaf without much further processing subsequent to the extrusion. Such a sharp or the like cutting instrument is more suitably employed in making the first cut.

Subsequent to cutting, the cut portions are preferably dried to obtain final product. Drying can include employment of oven heat, freeze drying, mere drying including sun drying, smoking such as in a smokehouse with or without added heating and so forth and the like. Drying which includes the oven heat and/or smoking with added heating. The oven heating is preferred and is typically suitable.

Times of the drying can vary and are those sufficient for obtaining the desired final product, as the artisan appreciates. Suitable times, for illustration, for the oven drying can range about values such as generally set forth in the following table.

TABLE IV

| Size of cut jerky | Oven cure time |
|---|---|
| Regular Cut | |
| 4⅝ inches (about 11.75 cm) by 1¼ inches (about 3.18 cm) | 3-10 hours |
| by 0.10 to 0.12 of an inch (about 0.25 cm to about 0.30) | |
| Thick Cut | |
| 4⅝ inches by 1¼ inches by 0.15 to 0.17 of an inch (about 0.38 cm to about 0.43 cm) | 5-12 hours |

Drying, in general, is carried out until the final product has the desired level of moisture retained therein. Initially, for example, the meat dough can have from about 65 to 70 percent water therein and drying is carried out to remove at least some of this. Desirably, the drying is carried out until the lengthwise or otherwise coextensively aligning jerky has at most about thirty-five percent by weight water or the like content. The drying, for instance, can be carried out until at most about twenty-five percent by weight water remains in the final product. Preferably, the drying is carried out until the water content is from about 15 to about 20 percent or so, including, for example, about 16 to 17 percent. Concurrently, water activity is generally low, which can be suitably from, say, 0.60 to 0.70 and may even be about 0.73. See e.g., Gellman et al. U.S. Pat. Nos. 4,454,163 (June 12, 1984); 4,454,164 (June 12, 1984); 4,534,989 (Aug. 13, 1985); 4,534,990 (Aug. 13, 1985); 4,546,001 (Oct. 8, 1985); 4,551,343 (Nov. 5, 1985) regarding water activity and other properties, and which are each incorporated herein by reference.

The oven drying is typically carried out in an appropriate oven which is capable of heating ambient gases, for example, air and so forth, generally surrounding the drying coextensively aligning jerky in stepwise fashion, say, from approximately 100° F. (about 37.8° C.) to approximately 200° F. (about 93.3° C.) at, say, approximately 20° F. steps (about 11.1° C. steps) which are from, say, about one to three hours per step. A starting temperature which is preferred in same is approximately 120° F. (about 48.9° C.), and ending temperatures which are preferred in same are from approximately 145° F. (62.8° C.) including to approximately 160° F. (about 71.1° C.) to approximately 180° F. (about 82.2° C.) to obtain the desired final product. Further taking into account considerations such as fat, wax or oil content of the coextensively aligning jerky and any propensity thereof to "bleed" or ooze from the coextensively aligning jerky at hand and the actual oven operation and design which is employed, and so forth, wide variation is possible in the drying which provides desirable lengthwise and otherwise coextensively aligning jerky.

So-called curing, with or without drying, may be carried out, say, at a curing station. Curing agents can be added. See e.g., Roth, U.S. Pat. No. 4,239,785 (Dec. 16, 1985), which is incorporated herein by reference.

The coextensively aligning jerky, including, of course, the lengthwise coextensively aligning jerky, can have the plurality of surfaces having a matte appearance. Desirably, two substantially apparent surfaces, for example, those which are commonly referred to as the top and bottom, that is, those which are bounded by the lengths and widths, have the matte appearance. However, a shiny coating, for example, a sugar-containing glaze, can be optionally added to the coextensively aligning jerky in order to provide for surface(s) having a shiny appearance. The matte surface is typically capable of being present due to lower percentages of components such as the striate muscle, for example, due to up to about 30 or so percent by weight beef meat or similar component. A higher beef meat containing jerky can have a more shiny surface which is cut or is sliced analogous to the matte surface. Nonetheless, the matte appearance is desirably present. The following processing procedure is exemplary.

A. Mixing
1. Determine fat content of all available meats, by-products thereof and so forth as they are received, typically in a frozen state. Blend to fat content per desired final product.
2. Temper frozen meats and so forth to 24° F. to 28° F. (about −4.4° C. to about −2.2° C.).
3. Flake progressively to approximately ½ of an inch to one inch (about 1.27 cm to about 2.54 cm) cubic-like particles and grind these particulate meats and so forth, and next temper to 30° F. (about −1.1° C.) prior to actual further mixing.
4. Add into ribbon-type mixer. Mix for 3 to 18 minutes.
5. Remove approximately 30 lbs. (about 13.6 kg) as a representative sample from the mixer for fat analysis.
6. Double grind the sample through a small grinder, select a one pound (about 454 g) random sample from the above for fat analysis.
7. Process as is or blend further as desired.

B. Blending Minor Ingredients
1. Minor ingredients such as any seasonings and so forth are next added to the meat dough in the desired order of addition.
2. Blend for 10 minutes.

C. Extruding
1. Remove the batch from the blender when the batch reaches approximately 35° F. (about 1.67° C.).
2. The batch is next transferred to a positive pump vacuum extruder for loaf formation. Loaves are placed on freezer racks and are frozen overnight.

D. Cutting and Slicing
1. The frozen loaves are next band saw cut generally perpendicular to the direction of flow of the extrusion into 4⅝ inch (about 11.75 cm) loaf portions.
2. The cut frozen loaf portions are next tempered to proper slicing consistency which may be perhaps near to approximately 31° F. or 32° F. (about −0.5° C. or about 0.0° C.).
3. The loaf portions are cold cut sliced generally parallel to the direction of flow of the extrusion at either the "Regular" or the "Thick" thickness depending on the desired final product. The product which is sliced is next placed on screens, and is aligned to assure proper drying.

E. Drying
1. Screens are loaded onto drier racks.
2. Drier racks are placed in a multi-stage drier.
3. Racks remain in the drier for typically 5–7 hours (Regular Cut), typically 8–10 hours (Thick Cut) at the appropriate temperatures until the desired moisture levels are obtained.
4. Racks are next removed from the drier, and the product is allowed to cool to room temperature.

F. Packaging
1. Product is next removed from the screens into poly-lined baskets, is weighed, is identified as to the drier rack it is removed from, is covered and is placed on storage carts.
2. The product is next placed in the correct package with proper codes on both individual packages and shipping containers.

Further preferred embodiments are especially described in reference to the drawings.

DRAWINGS

I. In Brief

FIG. 6 (FIG. 6) is a top view of part of the apparatus which has the directional flow bar extruder 200.

FIG. 7 (FIG. 7) is a side view of the part of the apparatus which has the directional flow bar extruder 200 as generally graphically illustrated from FIG. 6.

FIG. 9 (FIG. 9) is an oblique perspective view of the exit portion 240 from in front of and above same.

II IN DETAIL

Figure 1:
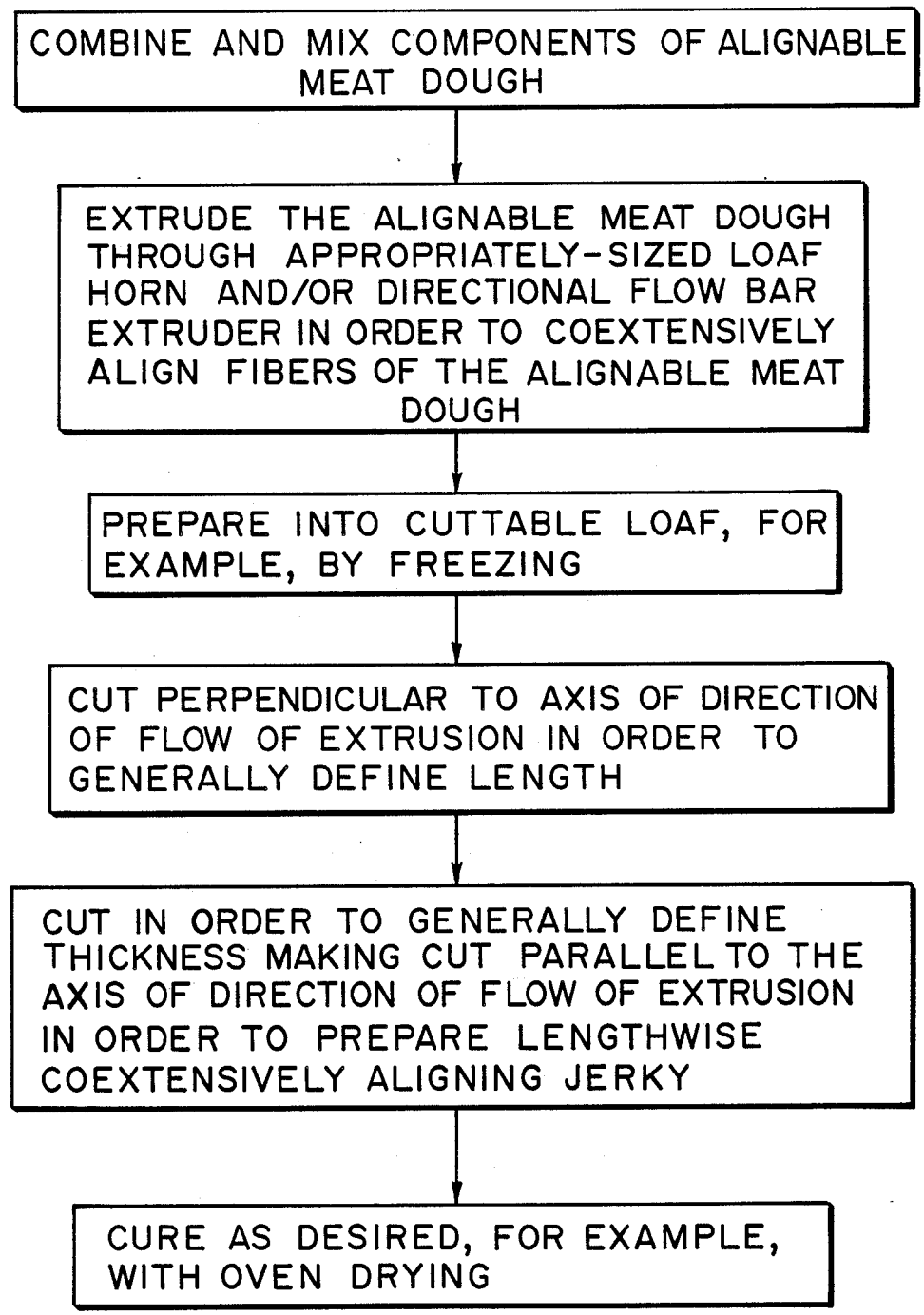
FIG. 1 (FIG. 1) is a schematic flow chart illustration of generally preferred embodiments of the procedure for preparation of the coextensively aligning jerky.

In FIG. 1, reference can be generally had to other written portions of the specification and so forth.

Figure 2:
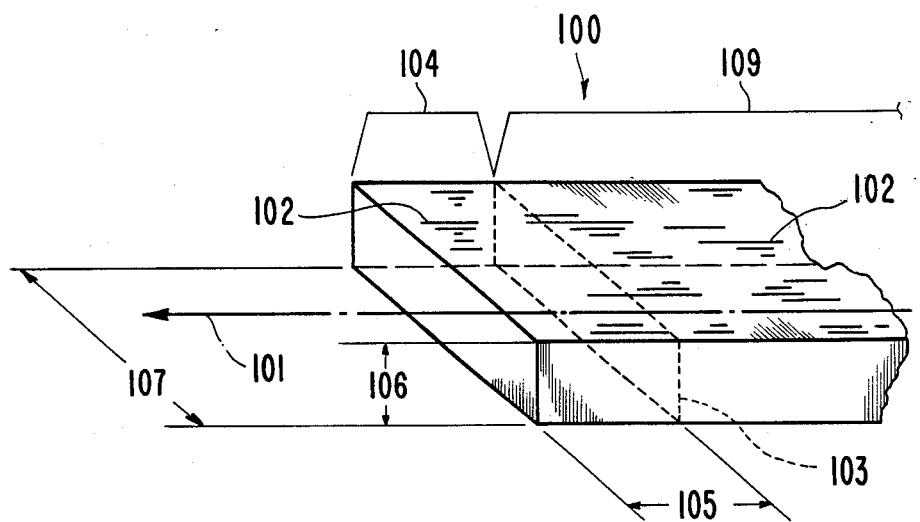
FIG. 2 (FIG. 2) is an oblique perspective view of the alignable meat dough which has been passed through the appropriately-sized loaf horn or the directional flow bar extruder and wherein the fibers in said dough are coextensively aligned and which can be the cuttable jerky.

In FIG. 2, said dough wherein the fibers are coextensively aligned 100 can be the cuttable jerky has axis in the direction of flow of extrusion of the loaf 101 and coextensively aligning fibers 102 which are coextensive with the axis 101 when made cuttable, for example, by freezing, cut 103 is made in a plane perpendicular to the axis 101 which severs section 104 from remaining section 109. The section 104 has section length 105 and height 106 and width 107. The section length 105 can be, for example, from approximately four to six inches (about 10.16 cm to about 15.24 cm), and the section height 106 can be, for example, from approximately three-fourths to one-and-one-fourth inches (about 1.905 cm to about 3.18 cm), and the section width 107 can be, for example, approximately four or twelve, or twenty and-one-half inches (about 10.16 cm or about 30.48 cm, or about 52.07 cm).

Figure 3:
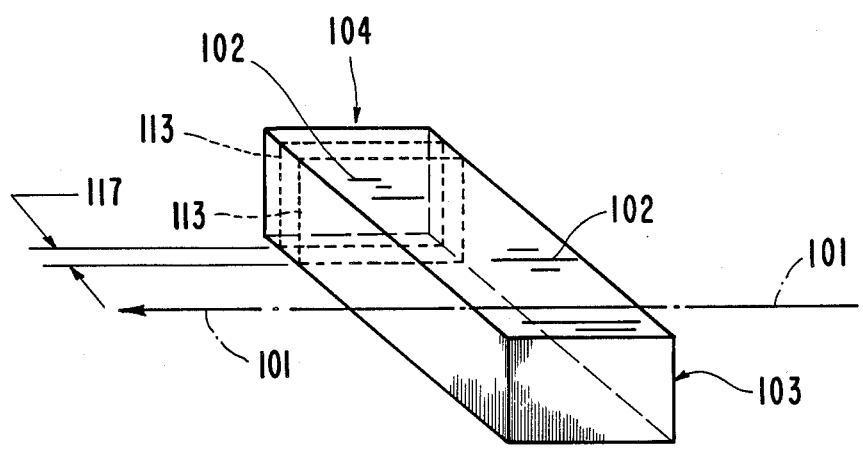
FIG. 3 (FIG. 3) is generally the oblique perspective view of the cuttable jerky section 104 as from FIG. 2.

In FIG. 3, the cuttable jerky section 104, is severed from the remaining section 109 (not illustrated in FIG. 3), and the axis 101, the coextensively aligning fibers 102 and plane of the cut 103 are also illustrated as generally from FIG. 2, and cuts 113 are made in planes parallel to the axis 101, which are thus perpendicular to the cut 103. The cuts 113 define thickness 117.

Figure 4:
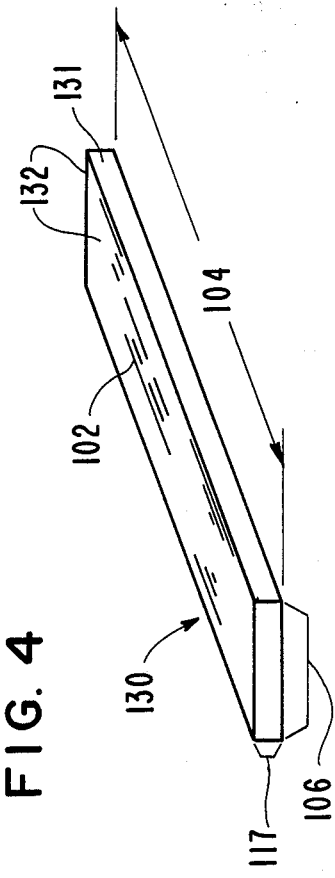
FIG. 4 (FIG. 4) is an oblique perspective view of lengthwise coextensively aligning jerky 130.

In FIG. 4, the lengthwise coextensively aligning jerky 130 is cured and has coextensively aligning fibers 102, has dimensions generally of length 104, width 106 and thickness 117, has rugged sides 131 and rugged, natural-like matte surfaces 132 as corresponding from the cuts 103 and 113 (not illustrated in FIG. 4) and has good, natural-like flexibility in the direction of the length 104 and natural-like tearability.

Figure 5:
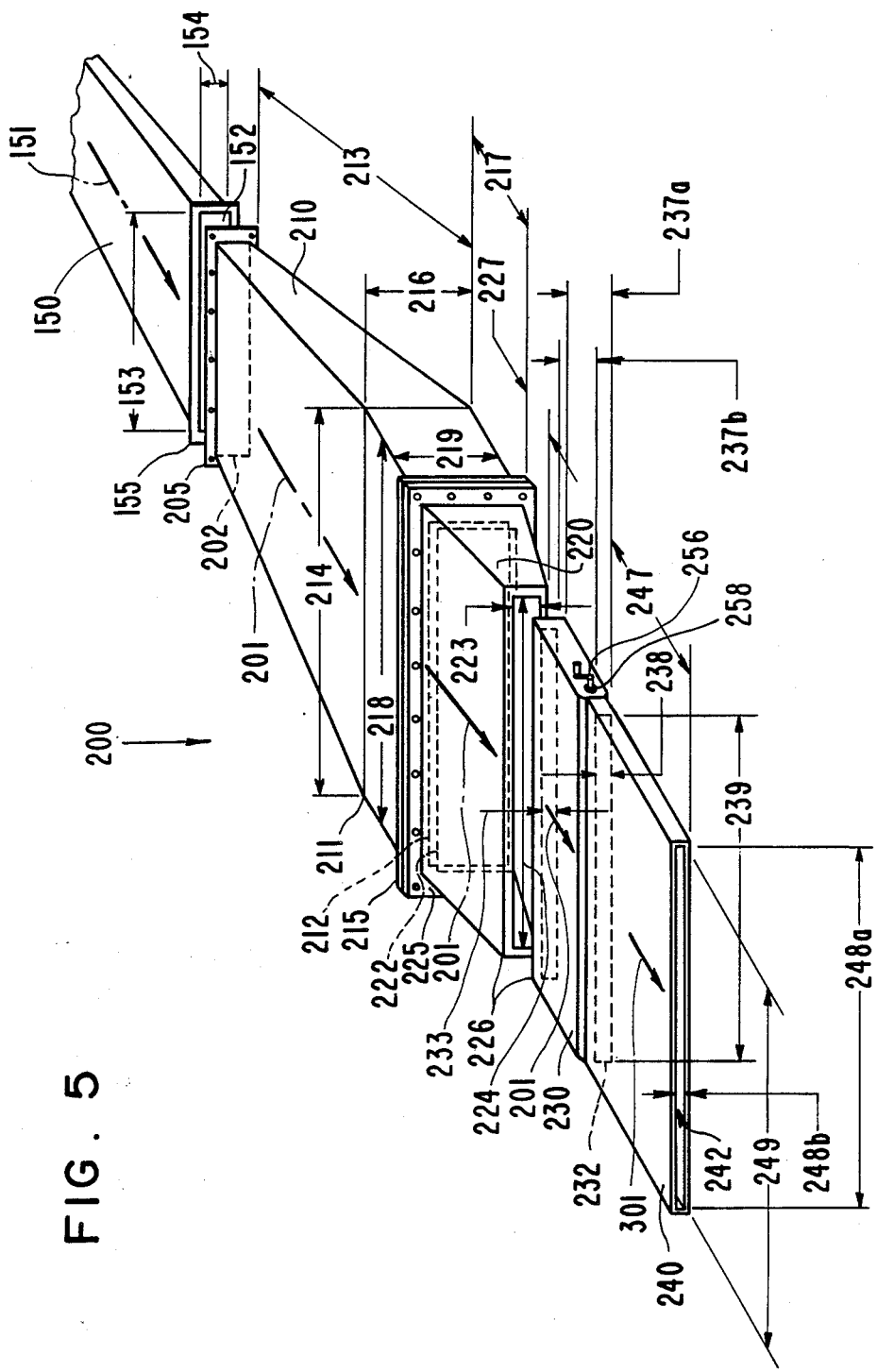
FIG. 5 (FIG. 5) is an oblique perspective, partially exploded view of part of an apparatus which has directional flow bar extruder 200.

In FIG. 5, the directional flow bar extruder 200 is coupled to a so-called V-mag horn 150 which is capable of passing through the alignable meat dough in axis of direction of flow of extrusion 151 and having an exit orifice 152 of width 153 and height 154, which can be, for example, inside dimensions of nine and-one-fourth inches (e.g., about 23.50 cm) and one and-one-fourth inches (e.g., about 3.18 cm), respectively. The horn 150 at the exit orifice 152 has flange 155 which is connectable to flange 205 on housing portion 210 of the directional flow bar extruder 200 preferably such as by nuts and bolts, clips and so forth and the like. Assembly and disassembly by means of and at such flange junctions provides access for cleaning and provides increased portability of the apparatus having the directional flow bar extruder. Entrance orifice 202 of housing portion 210 is thus capable of being in general registry with the exit orifice 152 of the horn 150. The alignable meat dough is passed under pressure of extrusion into passageway in the housing portion 210 along axis of direction of flow of extrusion 201 through the entrance orifice 202. The axis 201 is generally coextensive with the axis 151. The actual design of a housing portion such as the housing portion 210 is generally not critical, but the housing portion 210 can have apex 211, for example, the plane of which (not explicitly illustrated in FIG. 5) is perpendicular to the axis 201 and is approximately twenty-one inches (about 53.34 cm) from the entrance orifice 202. Inside dimensions at the apex 211 can be, for example, width 214 of approximately twenty and one-half inches (about 52.07 cm) and height 216 approximately six inches (about 21.24 cm) from the plane of the apex 211, the housing portion 210 extends a distance 213, for example, approximately six inches (about 21.24 cm) in a direction parallel with the axis 201, having sides extending a distance in a direction 219 corresponding to the height 216, for example, approximately six inches (about 21.24 cm) throughout the insides and top and bottom panels and extending a distance 218 in a direction corresponding to the width 214, for example, approximately twenty and one-half inches (about 52.07 cm) throughout the insides, which ends in exit orifice 212 and is of a length 217 from the apex 211. The housing portion 210 at the exit orifice 212 has flange 215 which is connectable to flange 225 of the housing portion 210 of the directional flow bar extruder 200 preferably such as by nuts and bolts, clips and so forth and the like. The housing portion 220 has entrance orifice 222 capable of thus being in general registry with the exit orifice 212 of the housing portion 210. The alignable meat dough is further passed under pressure of extrusion along the axis 201 into the housing portion 220. The housing portion 220 extends from the entrance orifice 222 into a sealable passageway juncture 226, which is sealed preferably such as by welding of metal pieces and is to be in registry with inlet channel portion 230 of the directional flow bar extruder 200. The inlet channel portion 230 is a further passageway for the alignable meat dough, and the alignable meat dough is extruded therethrough also. In relation to the type of the directional flow bar actually selected, for example, directional flow bar 250, and to the size of the coextensively aligning loaf which is desired to be prepared by extrusion through the directional flow bar extruder 200, such dimensions immediately surrounding the directional flow bar, for example, the directional flow bar 250, as those of the inlet channel portion 230 and exit channel portion 240 are generally more crucial than are such dimensions as, in general, are the housing portions 210 and 220. The sealable passageway juncture 226 has passageway juncture inside dimensions of height 223, for example, one and nine-sixteenth inches (about 3.97 cm), and width 224, for example, twenty and one-half inches (about 52.07 cm) each measured at a distance 227, for example, six inches (about 15.24 cm), from the entrance orifice 222 and parallel to the axis 201. In employment especially with the directional flow bar 250, the inlet channel portion has inside length 237, for example, approximately six inches (about 15.24 cm) as is measured parallel to the axis 201 from the sealable passageway juncture 226 to the beginning of the exit channel portion 240, inside width 234, for example, twenty and one-half inches (about 52.07 cm), and inside height 233, for example, one and nine-sixteenth inches (about 3.97 cm) throughout approximately the first five and one-half inches (about 13.97 cm) of the length 237a which is partial length 237b and is measured from the sealable passageway juncture 226 and inside top and bottom panels from there each communicating, for example, in mirror image planes, with exit gap 232 having dimensions of height 238, for example, three fourths of an inch (about 1.95 cm) and width 239, for example, twenty and one-half inches (about 52.07 cm). The exit channel portion 240 has an entrance orifice (not illustrated in FIG. 5) which is in registry with the exit orifice 232, whereabout the exit channel portion 240 is connected with the entrance channel portion 230, preferably such as by appropriate welding of metal parts. The exit channel portion 240 is regularly shaped to have its sides, top and bottom in communication with exit orifice 242. The exit orifice 242 has dimensions which are internally measured at distant heights 248a, for example, each from one and one-eighth inch to one and one-fourth inch (about 2.86 cm to about 3.18 cm), central height 248b, for example, thirteen-sixteenths of an inch (about 2.06 cm) and width 249, for example, approximately twenty and one-half inches (about 52.07 cm). The exit channel portion 240 has length 247, for example, approximately ten inches (about 26.4 cm). More generally,, especially with the directional flow bar 250, the partial length 237b is preferably from four to six times the height 233, and the length 247 is preferably from six to ten times the average of both of the distant heights 248a. The directional flow bar 250 can have maneuvering handle 256 and tap screw 258 for adjusting and setting thereof. Flow within the exit channel portion 240 is along axis of direction of flow of extrusion 301 which is parallel with the axis 201. The axis 301 corresponds in the appropriate parallel manner with the axis 101 of FIG. 1 and FIG. 3.

In FIG. 6, illustrated components of and illustrations in connection with the directional flow bar extruder 200 and the horn 150 are in general correspondingly graphically illustrated in FIG. 5. In addition thereto, center axis 2001 is illustrated, which is the axis at the mathematical center of the directional flow bar extruder 200 with the horn 150 and forms axis of symmetry, perhaps generally of symmetry point group $C_{2v}$ with respect to the housing components as two separate symmetry planes at right angles to each other which bisect at the axis 2001. Also, internal entrance width 156, for example, approximately one and seven-eighths inches (about 4.76 cm), and length 157, for example, approximately twenty-three and one-half inches (about 59.69 cm) of the horn 150 is here illustrated. Also, partial length 237c, for example, three-fourths of an inch (about 1.905 cm), is illustrated and is measured from the exit gap 232 (not shown in FIG. 6) to the center, which center is preferably the pivot point of the directional flow bar 250 (not shown in FIG. 6).

In FIG. 7, all illustrated components of and illustrations in connection with the directional flow bar extruder 200 and the horn 150 are in general correspondingly graphically illustrated in FIG. 5 and/or FIG. 6. In addition thereto, internal entrance height 159 of the horn 150 is illustrated.

Figure 8:
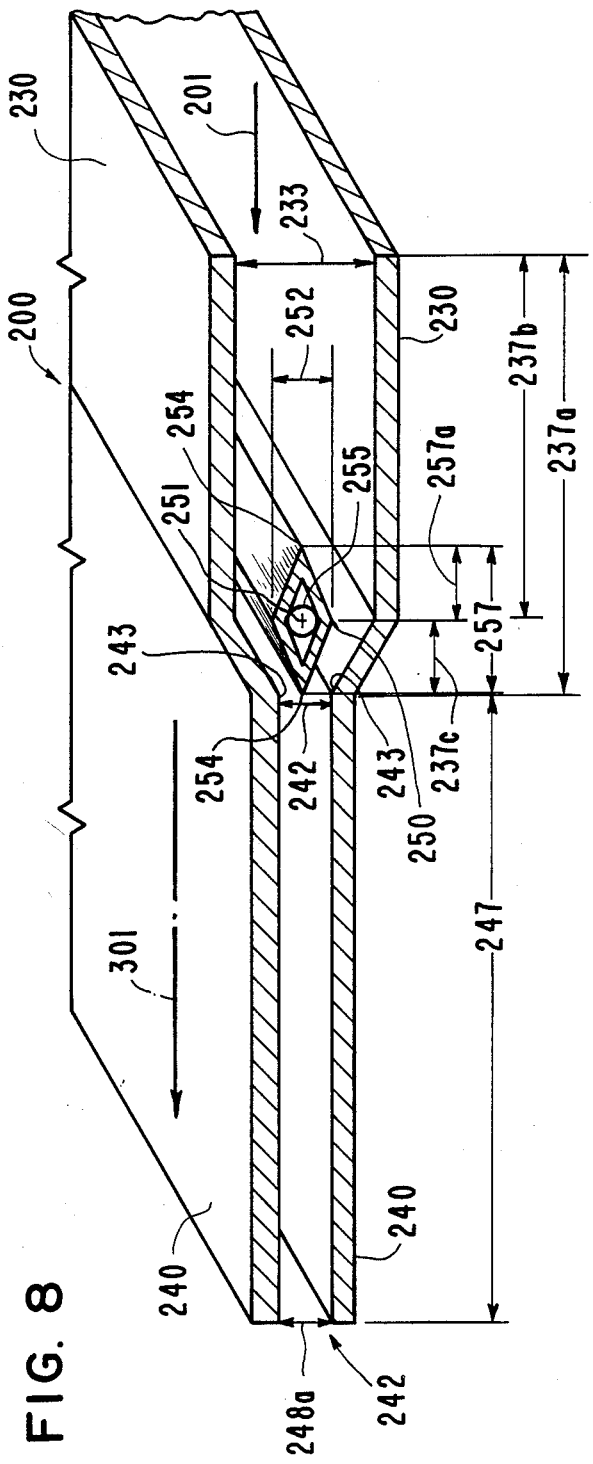
FIG. 8 (FIG. 8) is a partial, cutaway and perspective view of the directional flow bar 250 and immediately surrounding housings, which view is from an oblique rearward and topward position from the directional flow bar 250.

In FIG. 8, illustrated components and illustrations in connection therewith are as graphically illustrated from FIGS. 5 through 7, inclusively. In addition, height 242, for example, closely approximate to three-fourths of an inch (about 1.905 cm) of the exit portion 240 is illustrated, and slight areas of recess 243 are provided, for example, by grinding material from joinder of the tops and bottoms of the entrance portion 230 and the exit portion 240 and removing matter to a depth approximately one-sixteenth to one-eighth of an inch (about 0.159 cm to about 0.318 cm) about the former apex thereof and to a length of approximately three-fourths of an inch to an inch (about 1.905 to about 2.54 cm) generally across the entire width 239 (not completely illustrated in FIG. 8). The directional flow bar 250 has a regular diamond-like shape across the width of the directional flow bar extruder 200 thereat having external dimensions of height 252, for example, one-half inch (about 1.27 cm) and length 257, for example, one and one-half inches (about 3.81 cm), thus generally having axis of center of symmetry 251 as perhaps of the symmetry point group $C_{2v}$ and having partial length 257a which is generally half the distance of the length 257. The directional flow bar has leading edges 254 which are generally rounded, for example, having a one-sixteenth of an inch (about 0.159 cm) radius. Preferably, the directional flow bar preferably internally has a supporting axial member 255, for example a one-fourth of an inch diameter steel rod, about which the directional flow bar 250 can be adjusted and set in place in order to provide jerky products with varying parts or percentages of coextensively aligning fibers within the final product as desired. Aligning of the directional flow bar 250 is preferably by adjusting the maneuvering handle 256 (not illustrated in FIG. 8), and setting of the directional flow bar 250 is preferably by setting of the tap screw 258 (not illustrated in FIG. 8). The directional flow bar is suitably operated, for example, generally symmetric with respect to the top and bottom of the entrance portion 230, having the height 252 perpendicular and the length 257 parallel thereto.

In FIG. 9, illustrated components and illustrations in connection therewith refer to those features which are in general graphically illustrated in FIGS. 5 through 8, inclusively.

Figure 10:
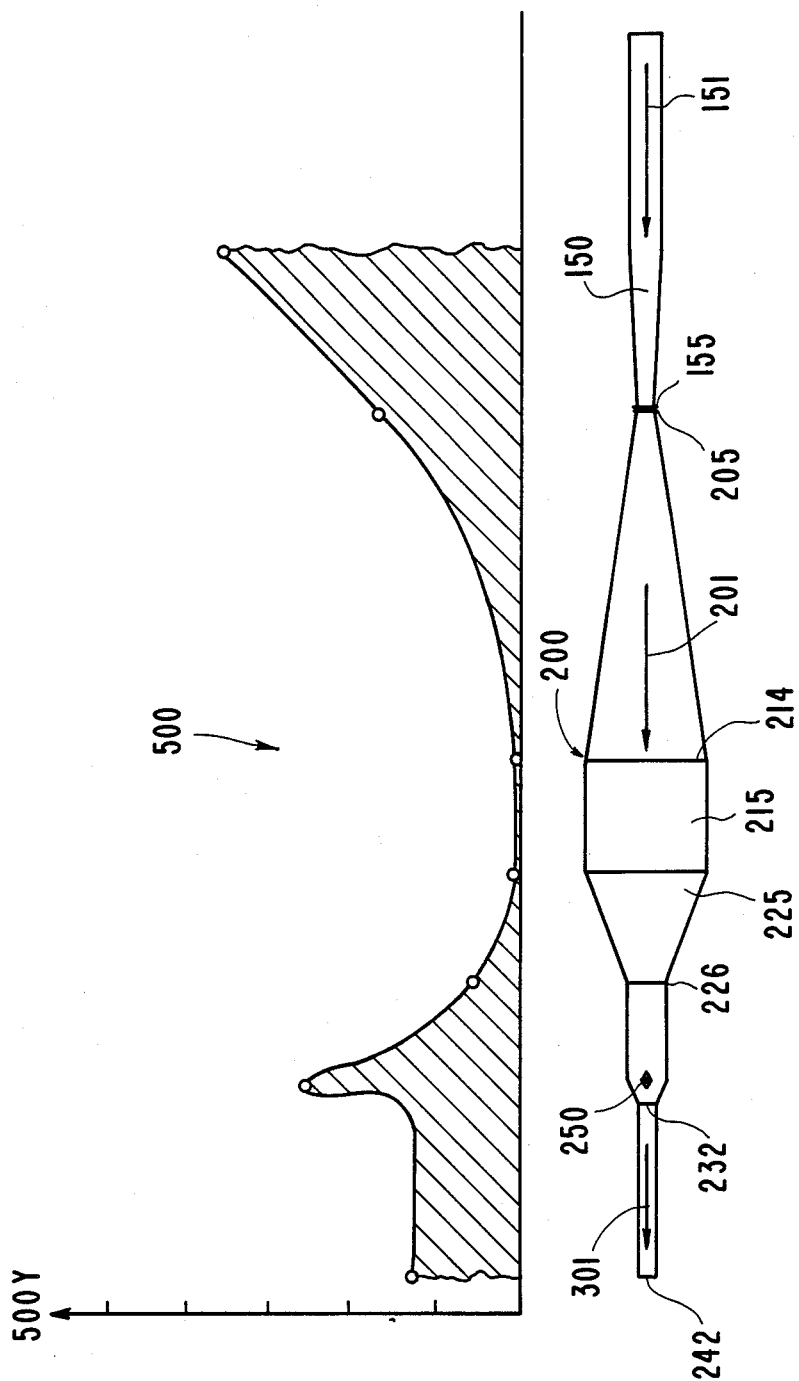
FIG. 10 (FIG. 10) is a graph 500 of Newtonian Shear Rate.

In FIG. 10, the abscissa 500y is in units of reciprocal seconds ($s^{-1}$), and points on the ordinate 500x correspond to those represented by a side view of the apparatus having the directional flow bar extruder 200 which is employed in conjunction with the horn 150. The graph 500 is based on an extrusion flow rate of 215 pounds (97.7 Kg) of the alignable meat dough per hour.

The following example further illustrates the invention. Percentages and so forth therein are generally by weight unless otherwise specified.

EXAMPLE

An alignable meat dough, which is separately the alignable meat dough from Table II or III is mixed and is extruded through an apparatus having the V-mag horn 150 connected to the directional flow bar extruder 200 with operational parameters including dimensions as set forth in the foregoing Drawings portions and prefaced by the phrase "for example" except that the dimensions are generally more closely approximate. The extruding apparatus having portions of the V-mag horn which is connected to the directional flow bar extruder has its directional flow bar extruder of one-fourth inch (about 0.635 cm) steel plate and the directional flow bar 250 is of one-eighth inch (about 0.318 cm) steel plate and, unless connected by assembling fasteners at the flanges, are welded together appropriately. The extrusion results in a Newtonian Shear rate about the exemplary directional flow bar 250 of about 25.7 $s^{-1}$. The coextensively aligning loaf is frozen and is cut perpendicularly to the axis of flow of extrusion at approximately four and one-half inch (about 11.43 cm) intervals and is further cut parallel to the axis of direction of flow, by appropriately stacking the four and one-half inch loaf portions which are tempered from being so frozen, to slicing consistency, at approximately one-tenth inch (about 0.25 cm) or seventeen-hundredths inch (about 0.43 cm) regular intervals. The cut pieces are dried in a multistage oven. The beginning temperature is about 120° F. (about 48.9° C.) and is increased at 20° F. steps (about 11.1° C. steps) approximately two to three hours in the first step and next two to three more hours or so in the second step of drying. Moisture content of the resulting product is about 17 percent by weight, and water activity is generally from about 0.6 to about 0.7. The resulting product is lengthwise coextensively aligning jerky having substantially all the fibers therein aligning generally parallel with the axis of the direction of flow of extrusion (lengthwise side of product) and is favorably sensed as a generally rugged, natural-like jerky product having at least top and bottom surfaces with a distinctive, natural-like feel and matte appearance, and has good lengthwise flexibility and natural-like jerky tearability, being more readily tearable along its length. The lengthwise coextensively aligning jerky product is generally hermetically packaged.

Many changes and modifications can be made and adopted in embodiments including practices in accordance with the present invention without substantially departing from its true, apparent and intended spirit and scope as any person skilled in the art as well as one of ordinary skill in the art appreciates in pursuance to and accordance with same as it is particularly pointed out and distinctly claimed as follows.

What is claimed is:

1. An extrusion nozzle for aligning fibers in an extrudable fiber-containing composition comprising:
   a. a housing having an inlet channel and an outlet channel, said inlet and outlet channels being defined by substantially parallel top and bottom portions; a first intermediate portion connecting the top of the inlet channel to the top of the outlet channel at an upper leading and trailing apex; a second intermediate portion connecting the bottom of the inlet channel to the bottom of the outlet channel at a lower leading and trailing apex; the first and second intermediate portions converging toward the outlet channel such that the height of the outlet channel is less than the height of the inlet channel;

b. at least one fiber-aligning flow bar having an essentially diamond-shaped cross-section having an upper and lower leading face converging to an acute angle leading edge and an upper and lower trailing face converging to an acute trailing edge, the leading and trailing edges defining a length of the flow bar and wherein said flow bar is operatively disposed transversely between and spaced from the converging first and second intermediate portions and the inlet channel of said housing to effect fiber alignment of a substantial amount of fiber in the extrudable composition.

2. The extrusion nozzle of claim 1 wherein the length of the first and second intermediate portions are substantially equal.

3. The extrusion nozzle of claim 1 wherein the length of the first and second intermediate portions are substantially equal to the length of the upper and lower trailing edges of the fiber-aligning flow bar.

4. The extrusion nozzle of claim 1 wherein the leading edge of the flow bar is substantially rounded.

5. The extrusion nozzle of claim 3 wherein the difference between the height of the outlet channel and the height of the inlet channel is substantially equal to the height of the flow bar.

6. The extrusion nozzle of claim 1 wherein the flow bar further includes a central axis and said flow bar is mounted in the housing with said central axis located in a plane essentially defined by the upper and lower leading apexes.

7. The extrusion nozzle of claim 6 wherein the flow bar is axially rotatable to effect a predetermined amount of fiber alignment and includes an axially disposed mounting rod.

8. The extrusion nozzle of claim 7 wherein the flow bar and mounting rod is selectively rotatable within the housing to selectively vary the extent of fiber alignment during extrusion.

9. The extrusion nozzle of claim 8 including means to adjustably rotate the flow bar and mounting rod and means to adjustably fix the flow bar in a predetermined position in the housing.

10. The extrusion nozzle of claim 1 wherein the angle defined by the upper and lower trailing faces of the flow bar is substantially equal to the angle defined by the converging first and second intermediate portions.

11. The extrusion nozzle of claim 10 wherein the flow bar is disposed whereby the first intermediate portion is substantially parallel to the upper trailing face of the flow bar and the second intermediate portion is substantially parallel to the lower trailing face of the flow bar.

12. The extrusion nozzle of claim 1 wherein the housing includes a discharge nozzle having a top and bottom defining an exit orifice and wherein the top and bottom converge longitudinally and transversely toward the center of the discharge nozzle.

13. An extrusion apparatus for aligning fibers in an extrudable fiber-containing composition comprising:

a. a housing having an inlet and an outlet, said inlet being defined by substantially parallel rectilinear first top and bottom members; said outlet being defined by substantially parallel rectilinear second top and bottom members; a first rectilinear intermediate member extending from the first top member to the second top member to form an upper leading apex and an upper trailing apex; a second rectilinear intermediate member connected to the first bottom member at a lower leading apex and to the second bottom member at a lower trailing apex, said first and second intermediate members converging toward the outlet;

b. a fiber-aligning flow bar adjustably mounted in said housing wherein said flow bar has an essentially diamond shape cross-section defined by upper and lower leading faces converging to an acute angle leading edge and upper and lower trailing faces converging to an acute angle trailing edge, the flow bar being mounted in the housing whereby its longitudinal axis is disposed at a midpoint in a plane defined by the upper and lower leading apexes, and wherein the upper and lower leading faces of the flow bar cooperate with the first top and bottom members and said upper and lower trailing faces cooperate with the first and second intermediate members of the housing to effect fiber alignment of a substantial portion of fiber in the extrudable composition.

14. The extrusion apparatus of claim 13 wherein the length of the first and second intermediate members is substantially equal to the length of the upper and lower trailing faces of the flow bar.

15. The extrusion apparatus of claim 13 wherein the leading edge of the flow bar is rounded.

16. The extrusion apparatus of claim 13 wherein the height of the outlet is equal to the difference between the height of the inlet and the height of the flow bar.

17. The extrusion apparatus of claim 13 wherein the flow bar is rotatable and includes an axially disposed mounting rod.

18. The extrusion apparatus of claim 17 including means to adjustably rotate the flow bar and fix the flow bar in a preselected position.

19. The extrusion apparatus of claim 13 wherein the angle defined by the upper and lower trailing faces is substantially equal to the angle defined by the converging first and second intermediate members.

20. The extrusion apparatus of claim 13 wherein the flow bar is disposed whereby the first intermediate member is substantially parallel to the upper trailing face and the second intermediate portion is substantially parallel to the lower trailing face of the flow bar whereby the trailing edge is disposed in a plane substantially defined by the upper and lower trailing apexes.

21. The extrusion apparatus of claim 13 further comprising a discharge nozzle having a top and bottom defining an exit orifice and wherein the top and bottom converge longitudinally and transversely toward the center of the discharge orifice.

22. An extrusion apparatus for aligning fiber in an extrudable fiber-containing composition comprising:

a. a housing having an inlet and an outlet; said inlet being defined by substantially parallel rectilinear first top and bottom members; said outlet being defined by substantially parallel rectilinear second top and bottom members; a first rectilinear intermediate member extending from the first top member to the second top member to form an upper leading apex and an upper trailing apex; a second rectilinear intermediate member extending from the first bottom member to the second bottom member to form a lower leading apex and a lower trailing apex, the first and second intermediate members converging toward the outlet;

b. a cooperating fiber-aligning flow bar having an essentially diamond shape cross-section defined by upper and lower leading faces converging to an acute angle leading edge and upper and lower trailing faces converging to an acute angle trailing edge, said flow bar being mounted in the housing whereby its longitudinal axis is in a plane defined by the upper and lower leading apexes and the upper and lower trailing faces are spaced from and oppose the first and second intermediate members and the upper and lower leading faces oppose the first top and bottom members a distance to effect alignment of a substantial portion of fibers generally parallel to the axis of flow; and c. a discharge nozzle at said outlet comprising a top and bottom to define an exit orifice and wherein the top and bottom converge longitudinally and transversely toward the center of the exit orifice.

23. The extrusion apparatus of claim 22 wherein the flow bar includes an axially disposed mounting rod rotatably received in side walls of the housing.

24. The extrusion apparatus of claim 22 wherein the longitudinal axis of the flow bar is disposed essentially at a midpoint between the upper and lower leading apexes.

25. The extrusion apparatus of claim 22 wherein the length of the first and second intermediate members is substantially equal to the length of the upper and lower trailing faces of the flow bar.

26. The extrusion apparatus of claim 22 wherein the leading edge of the flow bar is rounded.

27. The extrusion apparatus of claim 22 wherein the height of the outlet is equal to the difference between the height of the inlet and the height of the flow bar.

28. The extrusion apparatus of claim 23 including means to rotate the flow bar and means to selectively fix the axial position of the flow bar and mounting rod.

29. The extrusion apparatus of claim 22 wherein the angle defined by the upper and lower trailing faces of the flow bar is substantially equal to the angle defined by the converging first and second intermediate members.

30. The extrusion apparatus of claim 22 wherein the flow bar is disposed in the housing whereby the first intermediate member is substantially parallel to the upper trailing face and the second intermediate member is substantially parallel to the lower trailing face whereby said trailing edge is in a plane defined by the upper and lower trailing apexes of the housing.

* * * * *